United States Patent
Katagi et al.

(10) Patent No.: US 11,661,475 B2
(45) Date of Patent: *May 30, 2023

(54) EPOXY RESIN, EPOXY RESIN COMPOSITION, EPOXY RESIN CURED PRODUCT AND COMPOSITE MATERIAL

(71) Applicant: SHOWA DENKO MATERIALS CO., LTD., Tokyo (JP)

(72) Inventors: Hideyuki Katagi, Tokyo (JP); Tomoko Higashiuchi, Tokyo (JP); Yuki Nakamura, Tokyo (JP); Kazumasa Fukuda, Tokyo (JP); Naoki Maruyama, Tokyo (JP); Lin Tian, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/274,763

(22) PCT Filed: May 27, 2019

(86) PCT No.: PCT/JP2019/020915
§ 371 (c)(1),
(2) Date: Mar. 9, 2021

(87) PCT Pub. No.: WO2020/054137
PCT Pub. Date: Mar. 19, 2020

(65) Prior Publication Data
US 2022/0049047 A1   Feb. 17, 2022

(30) Foreign Application Priority Data
Sep. 10, 2018 (JP) .............................. JP2018-168843

(51) Int. Cl.
*C08G 59/24* (2006.01)
*C08G 59/40* (2006.01)
*C08G 59/14* (2006.01)
*C08L 63/00* (2006.01)

(52) U.S. Cl.
CPC ....... *C08G 59/245* (2013.01); *C08G 59/4064* (2013.01)

(58) Field of Classification Search
None
See application file for complete search history.

(56) References Cited

U.S. PATENT DOCUMENTS

| | | | |
|---|---|---|---|
| 2009/0105388 A1* | 4/2009 | Tanaka | H05K 1/0373 524/430 |
| 2011/0049426 A1 | 3/2011 | Patel et al. | |
| 2012/0149807 A1* | 6/2012 | Asaumi | C07D 303/30 560/72 |
| 2017/0349695 A1* | 12/2017 | Katagi | C08G 59/245 |
| 2019/0225794 A1* | 7/2019 | Fukuda | C08L 63/00 |

FOREIGN PATENT DOCUMENTS

| | | | | |
|---|---|---|---|---|
| JP | 2001-114866 A | | 4/2001 | |
| JP | 2001114866 A | * | 4/2001 | |
| JP | 2002040647 A | * | 2/2002 | |
| JP | 2009-242572 A | | 10/2009 | |
| JP | 2011-74366 A | | 4/2011 | |
| JP | 2014-122337 A | | 7/2014 | |
| WO | WO-2016104772 A1 | * | 6/2016 | ............. C08G 59/24 |
| WO | WO-2017221810 A1 | * | 12/2017 | ............. B32B 27/12 |

* cited by examiner

*Primary Examiner* — Randy P Gulakowski
*Assistant Examiner* — Ha S Nguyen
(74) *Attorney, Agent, or Firm* — Solaris Intellectual Property Group, PLLC

(57) ABSTRACT

An epoxy resin includes a reaction product between an epoxy compound and a compound having a naphthalene structure and a functional group that is reactive with an epoxy group.

9 Claims, No Drawings

EPOXY RESIN, EPOXY RESIN COMPOSITION, EPOXY RESIN CURED PRODUCT AND COMPOSITE MATERIAL

TECHNICAL FIELD

The present disclosure relates to an epoxy resin, an epoxy resin composition, an epoxy resin cured product and a composite material.

BACKGROUND ART

In recent years, in conjunction with the trend towards energy conservation, materials used in the field of electronic materials, industrial equipment and aerospace have been shifting from ceramics, metals and the like to more lightweight resin materials.

In applying resin materials as an alternative materials to metals, composite materials that include an inorganic material such as a fiber and a resin material in combination are generally used, since resins alone often fail to satisfy desired thermal resistance and strength. In particular, carbon fiber-reinforced plastics (CFRPs), which are a composite material in which carbon fibers and a resin are combined, are attracting attention as a potential material that can achieve both lighter weight and improved strength, and have recently been adopted to the structural frameworks of airplanes.

In expanding the application of CFRPs to airplanes or the like, further improvement in strength, especially improvement in fracture toughness in opening mode (Gic), is desired. In view of this situation, use of thermosetting resins including epoxy resin, which are superior in terms of strength and thermal resistance as compared to thermoplastic resins, is being considered.

The fracture toughness in the opening mode can be drastically improved by using, for example, an epoxy resin having a mesogenic structure (for example, see Patent Document 1). This is presumably attributable to the intermolecular cohesion at the time of fracture, in other words, extension of cracks can be suppressed owing to stress relaxation.

RELATED ART DOCUMENTS

Patent Documents

[Patent Document 1] Japanese Patent Application Laid-Open (JP-A) No. 2014-122337

SUMMARY OF INVENTION

Technical Problem

While cured products of epoxy resins having a mesogenic structure have high fracture toughness, they tend to have low flexural modulus as compared to cured products of general purpose epoxy resins. The reason for this is presumably as follows. Mesogenic structures exhibit intermolecular stacking property owing to the interaction between π electrons, and thereby have long molecular lengths. Consequently, epoxy resins having a mesogenic structure have longer crosslinking distances, leading to a lower flexural modulus of the cured products.

Further, epoxy resins having a mesogenic structure tend to have inferior handleability as compared to general purpose resins, since they tend to have higher melting points. To solve this problem, measures have occasionally been taken in which part of the epoxy resin having a mesogenic structure is modified with a divalent phenol compound or the like to lower the melting point. However, depending on the type of phenol compound, the crosslinking distance may become longer, which may make it difficult to achieve the flexural modulus suitable for a structural material for airplanes.

As described above, in applying epoxy resins to CFRPs for airplanes or the like, it has been difficult to achieve both sufficient fracture toughness and flexural modulus using conventional techniques. In view of these circumstances, the present disclosure is directed to providing an epoxy resin that is capable of achieving both favorable fracture toughness and flexural modulus when cured, and an epoxy resin composition, an epoxy resin cured product and a composite material that employ the epoxy resin.

Solution to Problem

Means for solving the above-described problems include the following embodiments.

[1] An epoxy resin including a reaction product between an epoxy compound and a compound having a naphthalene structure and a functional group that is reactive with an epoxy group.

[2] The epoxy resin according to [1], wherein the compound having a naphthalene structure and a functional group that is reactive with an epoxy group includes a dihydroxynaphthalene compound.

[3] The epoxy resin according to [2], wherein the dihydroxynaphthalene compound includes at least one selected from the group consisting of 1,5-dihydroxynaphthalene and 2,6-dihydroxynaphthalene.

[4] The epoxy resin according to any one of [1] to [3], wherein the epoxy compound includes an epoxy compound having a mesogenic structure.

[5] The epoxy resin according to [4], wherein the mesogenic structure includes a structure represented by the following General Formula (M).

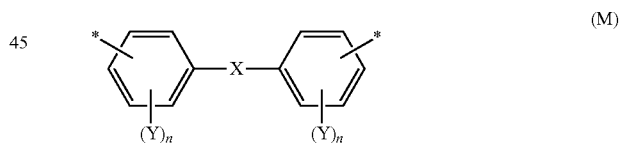

In General Formula (M), X represents a single bond or at least one linking group selected from the following Group (A) of divalent groups; each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

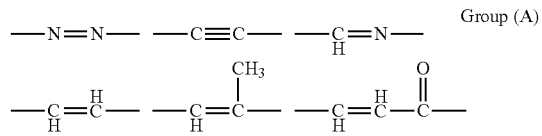

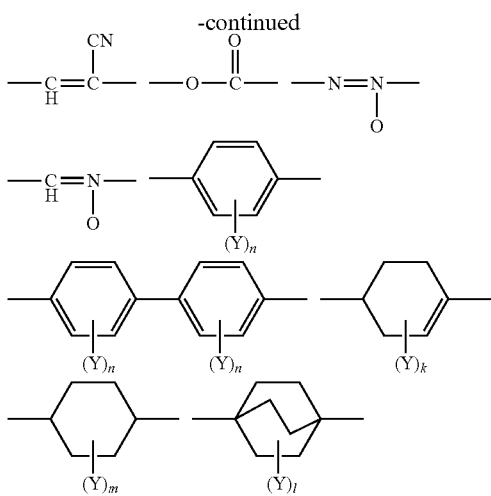

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

[6] The epoxy resin according to any one of [1] to [5], wherein the reaction product includes an epoxy compound represented by the following General Formula (a).

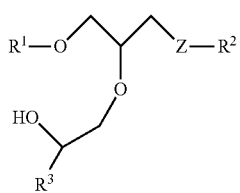

(a)

In General Formula (a), each of $R^1$, $R^2$ and $R^3$ independently represents a monovalent group, wherein at least one of the monovalent groups represented by $R^1$, $R^2$ and $R^3$ has a mesogenic structure, and at least one of the monovalent groups represented by $R^1$, $R^2$ and $R^3$ has an epoxy group; and each Z independently represents —O— or —NH—.

[7] The epoxy resin according to [6], wherein, in General Formula (a), $R^1$ is a monovalent group having a structure derived from a first epoxy compound, $R^2$ is a monovalent group having a structure derived from a second epoxy compound and the compound having a naphthalene structure and a functional group that is reactive with an epoxy group, and $R^3$ is a monovalent group having a structure derived from a third epoxy compound, wherein the first epoxy compound, the second epoxy compound and the third epoxy compound may be the same as or different from each other, and wherein at least one of the first epoxy compound, the second epoxy compound or the third epoxy compound has a mesogenic structure.

[8] The epoxy resin according to any one of [1] to [7], wherein, in an 80-minute continuous measurement of dynamic shear viscosity at a temperature of 80° C. using a viscoelastometer with a gap between a parallel plate and a stage of 0.05 mm, a frequency of 0.5 Hz and a strain of 8000%, a value of η'2/η'1 is 3 or less, the value of η'2/η'1 being obtained from an initial dynamic shear viscosity η'1 (Pa·s) and a maximum value of dynamic shear viscosity η'2 (Pa·s) obtained during the measurement.

[9] The epoxy resin according to [8], wherein the initial dynamic shear viscosity η'1 is 200 Pa·s or less.

[10] An epoxy resin composition including the epoxy resin according to any one of [1] to [9] and a curing agent.

[11] An epoxy resin cured product, which is a cured product of the epoxy resin composition according to [10].

[12] A composite material including the epoxy resin cured product according to [11] and a reinforcing material.

Advantageous Effects of Invention

According to the present disclosure, an epoxy resin that is capable of achieving both favorable fracture toughness and flexural modulus when cured, and an epoxy resin composition, an epoxy resin cured product and a composite material that employ the epoxy resin are provided.

DESCRIPTION OF EMBODIMENTS

Embodiments for carrying out the invention will be described below in detail. However, the invention is not limited to the following embodiments. In the following embodiments, components (including elemental steps, etc.) thereof are not essential unless otherwise specified. The same applies to numerical values and ranges, which do not limit the invention.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, each component may include plural substances corresponding to the component. In a case in which plural substances corresponding to respective components are present in a composition, an amount or content of each component in the composition means the total amount or content of the plural substances present in the composition unless otherwise specified.

The term "epoxy compound" as used herein refers to a compound having an epoxy group in a molecule thereof.

The term "epoxy resin" indicates a group of epoxy compounds in an uncured state.

<<Epoxy Resin>>

An epoxy resin in the present disclosure contains a reaction product between an epoxy compound and a compound having a naphthalene structure and a functional group that is reactive with an epoxy group. Hereinafter, the epoxy compound that is a reaction product between an epoxy compound and a compound having a naphthalene structure and a functional group that is reactive with an epoxy group is also referred to as a "specific epoxy compound". Further, the compound having a naphthalene structure and a functional group that is reactive with an epoxy group is also referred to as a "specific naphthalene compound".

An epoxy resin containing the specific epoxy compound tends to exhibit both favorable fracture toughness and flexural modulus of a cured product. While the reason for this is not clear, it is thought that modification of an epoxy resin using the specific naphthalene compound as a modifying agent reduces the free volume owing to a formation change in the molecular structure, thereby enabling the improvement in the flexural modulus while maintaining the fracture toughness.

The epoxy resin in the present disclosure may or may not contain a different epoxy compound or epoxy resin, such as a monomer of an unreacted epoxy compound, as long as it contains the specific epoxy compound.

<Epoxy Compound>

The epoxy compound is not particularly limited as long as it is a compound that has an epoxy group. The epoxy compound is preferably an epoxy compound having two or more epoxy groups in a molecule thereof, more preferably an epoxy compound having two epoxy groups in a molecule thereof, and further preferably an epoxy compound having two glycidyl ether groups in a molecule thereof. One kind of epoxy compound may be used singly, or two or more kinds thereof may be used in combination.

Examples of the epoxy compound include a biphenyl epoxy compound, a bisphenol A epoxy compound, a bisphenol F epoxy compound, a bisphenol S epoxy compound, and a fluorene backbone-containing epoxy compound.

In an preferable embodiment, the epoxy compound includes a compound having a mesogenic structure. An epoxy resin that contains an epoxy compound having a mesogenic structure tends to form a higher-order structure when cured. Therefore, an epoxy resin that contains an epoxy compound having a mesogenic structure tends to exhibit superior fracture toughness of the cured product as compared to an epoxy resin that does not contain an epoxy compound having a mesogenic structure.

The mesogenic structure refers to a structure that is capable of causing an epoxy resin that is a reaction product of an epoxy compound having the mesogenic structure to exhibit liquid crystallinity. Specific examples of the mesogenic structure include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these mesogenic structures are linked via a linking group.

One molecule of the epoxy compound may have one mesogenic structure, or two or more mesogenic structures. In the epoxy compound having two or more mesogenic structures, the two or more mesogenic structures may be the same or different.

An epoxy resin that contains an epoxy compound having a mesogenic structure can form a higher-order structure in a cured product of an epoxy resin composition containing the epoxy resin. Here, the higher-order structure refers to a structure containing a higher-order structural body in which its components are arranged to form a micro- and organized structure. Examples of the higher-order structure include a crystalline phase and a liquid crystalline phase. The presence or absence of the higher-order structure can be determined using a polarized light microscope. Specifically, the presence or absence of the higher-order structure can be determined by whether or not an interference pattern due to depolarization is observed under crossed Nicols. The higher-order structure generally exists in a cured product of an epoxy resin composition in an island shape to form a domain structure, in which each island corresponds to the higher-order structure. The components of the higher-order structure are generally formed by covalent bonding.

Examples of the higher-order structure formed in a cured product include a nematic structure and a smectic structure. The nematic structure and smectic structure are each a type of liquid crystal structure. The nematic structure is a liquid crystal structure that has only an orientational ordering in which the major axes of the molecules are oriented in the same direction. On the other hand, the smectic structure is a liquid crystal structure that has a one-dimension positional ordering in addition to the orientational ordering, and has a layered structure. The degree of ordering is higher in the smectic structure than in the nematic structure. Therefore, from the viewpoints of thermal conductivity and fracture toughness of the cured product, it is more preferable that a higher-order structure having a smectic structure is formed.

Whether or not a smectic structure is formed in a cured product can be determined by X-ray diffraction measurement of the cured product. The X-ray diffraction measurement can be performed using, for example, an X-ray diffractometer by Rigaku Corporation. In the present disclosure, the formation of the smectic structure in a cured product is confirmed when a diffraction peak is observed in a range of 2θ=2° to 10°, the X-ray diffraction measurement being performed using CuKα1 radiation under a tube voltage of 40 kV and a tube current of 20 mA in a measurement range of 2θ=2° to 30°.

The mesogenic structure may be a structure represented by the following General Formula (M).

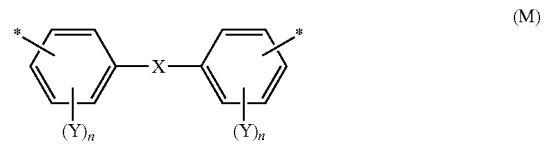

In General Formula (M), X represents a single bond or at least one linking group selected from the following Group (A) of divalent groups; each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

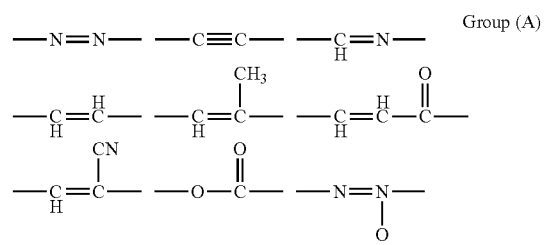

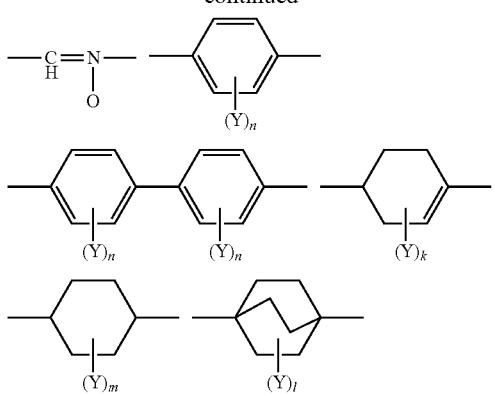

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In the mesogenic structure represented by Formula (M), when X is at least one linking group selected from Group (A) of divalent groups, the linking group is preferably at least one linking group selected from the following group (Aa) of divalent groups, more preferably is at least one linking group selected from the Group (Aa) and is a linking group that has at least one ring structure.

Group (Aa)

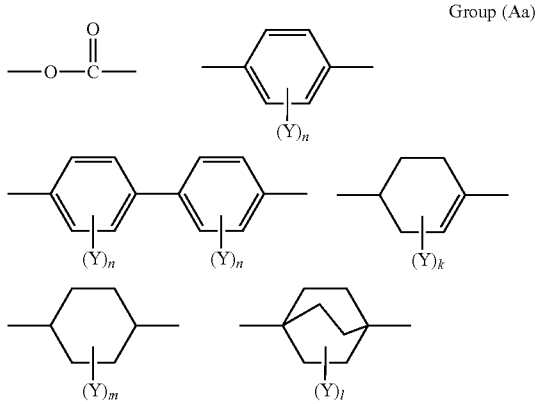

In Group (Aa), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

From the viewpoint of the tendency to form a higher-order structure in a cured product, it is preferable that the mesogenic structure represented by General Formula (M) is a mesogenic structure represented by the following General Formula (M-1).

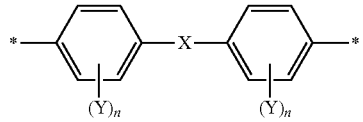

In General Formula (M-1), definitions and preferable examples of X, Y, n and * are the same as the definitions and preferable examples of X, Y, n and * in General Formula (M).

Preferable examples of the mesogenic structure represented by General Formula (M-1) includes a mesogenic structure represented by the following General Formula (M-2), a mesogenic structure represented by the following General Formula (M-3), and a mesogenic structure represented by the following General Formula (M-4). In General Formula (M-2), General Formula (M-3) and General Formula (M-4), definitions and preferable examples of Y, n and * are the same as the definitions and preferable examples of Y, n and * in General Formula (M-1).

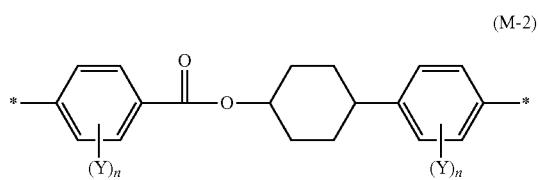

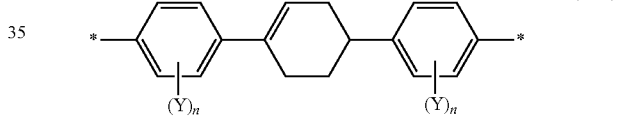

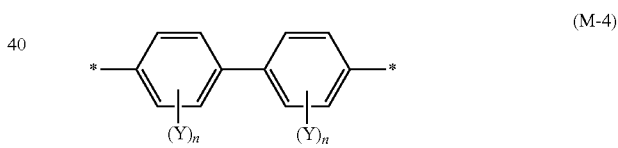

The epoxy compound may include an epoxy compound having a structure represented by the following General Formula (1-m).

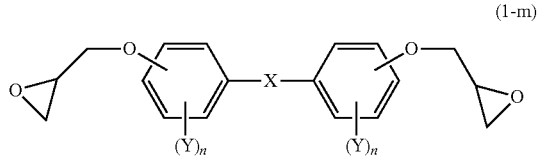

In General Formula (1-m), definitions and preferable examples of X, Y and n are the same as the definitions and preferable examples of X, Y and n in General Formula (M).

From the viewpoint of the tendency to form a higher-order structure in a cured product, the epoxy compound represented by General Formula (1-m) is preferably an epoxy compound having a structure represented by the following General Formula (2-m).

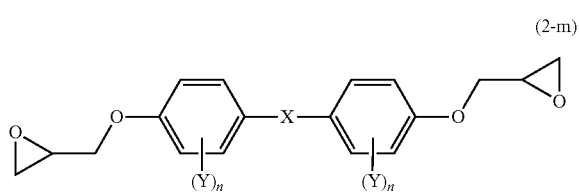

(2-m)

In General Formula (2-m), definitions and preferable examples of X, Y and n are the same as the definitions and preferable examples of X, Y and n in General Formula (1-m).

Preferable examples of the epoxy compound having a structure represented by General Formula (2-m) includes an epoxy compound having a structure represented by the following General Formula (3-m), an epoxy compound having a structure represented by the following General Formula (4-m), and an epoxy compound having a structure represented by the following General Formula (5-m). From the viewpoint of improving the fracture toughness of the cured product, it is preferable that the epoxy compound represented by General Formula (3-m) is used.

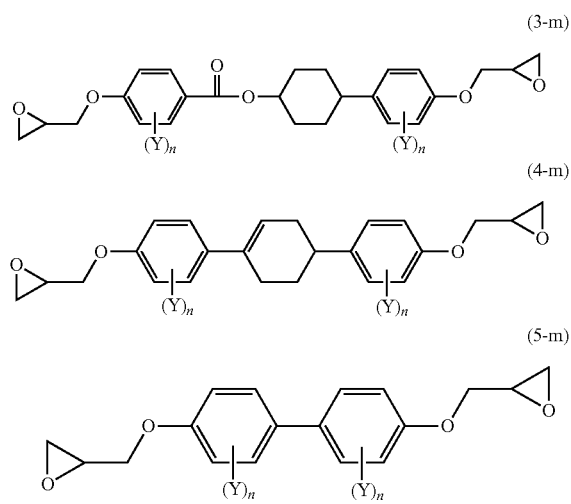

In General Formula (3-m), General Formula (4-m) and General Formula (5-m), definitions and preferable examples of Y and n are the same as the definitions and preferable examples of Y and n in General Formula (2-m).

For the epoxy compound, one that is commercially available may be used. For example, as the epoxy compound represented by General Formula (5-m), YX4000 (Mitsubishi Chemical Corporation), YL6121H (Mitsubishi Chemical Corporation) and the like are available.

The epoxy equivalent weight of the epoxy resin is not particularly limited. From the viewpoint of, for example, ensuring favorable crosslinking distance, glass transition temperature, elastic modulus or the like, the epoxy equivalent weight is preferably from 100 g/eq to 300 g/eq, more preferably from 120 g/eq to 280 g/eq, and further preferably from 140 g/eq to 260 g/eq. In the present disclosure, the epoxy equivalent weight is measured by perchloric acid titration.

<Specific Naphthalene Compound>

The specific naphthalene compound has a naphthalene structure and a functional group that is reactive with an epoxy group. Examples of the functional group that is reactive with an epoxy group include a hydroxy group, an amino group, an isocyanate group and the like. The specific naphthalene compound may have one functional group that is reactive with an epoxy group, or may have two or more functional groups that are reactive with an epoxy group, and preferably has two functional groups that are reactive with an epoxy group. The functional group may be bonded directly to the aromatic rings, or may be bonded to the aromatic rings via an alkylene oxide chain, such as an ethylene oxide chain or a propylene oxide chain, alkyl chain or the like.

Examples of the specific naphthalene compound include a dihydroxynaphthalene compound, which has a structure in which two hydroxy groups are bonded to a naphthalene structure, and a diaminonaphthalene compound, which has a structure in which two amino groups are bonded to a naphthalene structure. From the viewpoint of improving flexural modulus, a dihydroxynaphthalene compound is preferable. One kind of specific naphthalene compound may be used singly, or two or more kinds thereof may be used in combination.

Examples of the dihydroxynaphthalene compound include 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, and derivatives thereof. In particular, the dihydroxynaphthalene compound preferably includes at least one selected from the group consisting of 1,5-dihydroxynaphthalene and 2,6-dihydroxynaphthalene. It is thought that modification of an epoxy compound using 1,5-dihydroxynaphthalene or 2,6-dihydroxynaphthalene causes the epoxy compound to take a curbed molecular structure, which reduces the intermolecular free volume and further improves the flexural modulus.

Examples of the diaminonaphthalene compound include 1,2-diaminonaphthalene, 1,3-diaminonaphthalene, 1,4-diaminonaphthalene, 1,5-diaminonaphthalene, 1,6-diaminonaphthalene, 1,7-diaminonaphthalene, 1,8-diaminonaphthalene, 2,3-diaminonaphthalene, 2,6-diaminonaphthalene, 2,7-diaminonaphthalene, and derivatives thereof.

Examples of derivatives of the dihydroxynaphthalene compounds or diaminonaphthalene compounds include a compound having a substituent, such as an alkyl group having 1 to 8 carbon atoms, bonded to the naphthalene ring.

The functional group equivalent weight of the specific naphthalene compound is not particularly limited. From the viewpoint of efficiency of the reaction, the functional group equivalent weight of the specific naphthalene compound (in the case in which the functional group is an amino group, the equivalent weight of the active hydrogen) is preferably from 65 g/eq to 200 g/eq, more preferably from 70 g/eq to 150 g/eq, and further preferably from 75 g/eq to 100 g/eq.

<Specific Epoxy Compound>

The specific epoxy compound is a reaction product between an epoxy compound and the specific naphthalene compound. The structure of the specific epoxy compound is not particularly limited as long as it is a reaction product between an epoxy compound and the specific naphthalene compound. For example, the specific epoxy compound may include a dimer of an epoxy compound, or may include a tri- or higher multimer of an epoxy compound.

The specific epoxy compound may include, for example, at least one selected from the group consisting of an epoxy compound represented by the following General Formula (a) and an epoxy compound represented by the following General Formula (b).

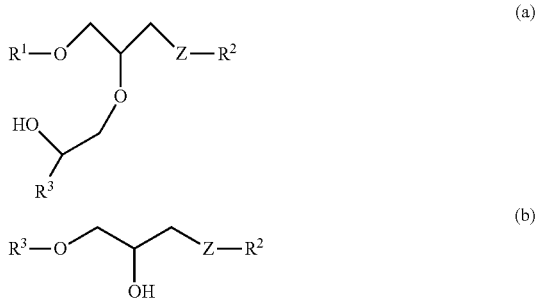

In General Formula (a), each of $R^1$, $R^2$ and $R^3$ independently represents a monovalent group, wherein at least one of the monovalent groups represented by $R^2$ and $R^3$ has a mesogenic structure, and at least one of the monovalent groups represented by $R^1$, $R^2$ and $R^3$ has an epoxy group.

Each Z independently represents —O— or —NH—.

In General Formula (b), each of $R^1$ and $R^2$ independently represents a monovalent group, wherein at least one of the monovalent groups represented by $R^1$ and $R^2$ has a mesogenic structure, and at least one of the monovalent groups represented by $R^1$ and $R^2$ has an epoxy group.

Each Z independently represents —O— or —NH—.

Details of the mesogenic structures in General Formula (a) and General Formula (b) are as described above.

From the viewpoint of favorable viscosity stability owing to suppression of increase in viscosity upon application of shear stress, the epoxy resin preferably contain an epoxy compound represented by General Formula (a).

An epoxy resin having a mesogenic structure in a molecule thereof generally has higher crystallinity and higher viscosity as compared to other epoxy resins, and therefore, there are cases in which sufficient flowability cannot be obtained upon handling. Further, there are also cases in which the viscosity increases by the molecules being oriented in one direction owing to shear flow of the resin. However, an epoxy resin containing an epoxy compound represented by General Formula (a) tends to have favorable viscosity stability. Although the reason for this is not clear, it is presumed that this is partly because part of the linearity of the molecular structure of the epoxy compound is disturbed by the branching structure (the portion represented by $R^3$), whereby the orientation of the molecules upon application of shear stress is suppressed. By the approach of introducing a branch into the molecule of an epoxy compound having a mesogenic structure, the orientation of the molecules upon application of shear stress can be suppressed without deteriorating the stacking property of the molecules caused by the mesogenic structure. Consequently, both improvement in the fracture toughness of the cured product and improvement in handleability before curing tend to be achieved.

In the case in which the monovalent group represented by $R^1$, $R^2$ or $R^3$ in General Formula (a) has a mesogenic structure, the monovalent group may or may not have an epoxy group.

In the case in which the monovalent group represented by $R^1$, $R^2$ or $R^3$ has a mesogenic structure, the monovalent group may consists only of the mesogenic structure, or may have the mesogenic structure and another structure in combination.

In the case in which the monovalent group represented by $R^1$, $R^2$ or $R^3$ has an epoxy group, the position of the epoxy group in the monovalent group is not particularly limited. For example, the monovalent group may have an epoxy group at the terminal. Further, the number of epoxy groups included in the monovalent group is not particularly limited, and the monovalent group may have one epoxy group or may have two or more epoxy groups.

The epoxy compound represented by General Formula (a) may have one mesogenic structure or two or more mesogenic structures in a molecule thereof. In the case in which the epoxy compound represented by General Formula (a) has two or more mesogenic structures in a molecule thereof, these mesogenic structures may be the same or different.

In the case in which the monovalent group represented by $R^1$, $R^2$ or $R^3$ in General Formula (a) does not have a mesogenic structure, examples of such a monovalent group include a monovalent group having an aliphatic hydrocarbon group, an aliphatic hydrocarbon-oxy group, an aromatic hydrocarbon group, an aromatic hydrocarbon-oxy group or the like. Examples of the aliphatic hydrocarbon group include an alkyl group and an alkenyl group, and examples of the aromatic hydrocarbon group include a phenyl group and a naphthyl group.

In the case in which the monovalent group represented by $R^1$, $R^2$ or $R^3$ does not have a mesogenic structure, the number of carbon atoms in such a monovalent group is not particularly limited, and may be, for example, 20 or less, or 15 or less. The monovalent group represented by $R^1$, $R^2$ or $R^3$ may be unsubstituted or may have a substituent.

In an embodiment, the epoxy compound represented by General Formula (a) may be an epoxy compound in which at least the monovalent groups represented by $R^1$ and $R^2$ each have a mesogenic structure, or may be an epoxy compound in which all of the monovalent groups represented by $R^1$, $R^2$ and $R^3$ have a mesogenic structure.

For example, the epoxy compound represented by General Formula (a) may be one in which $R^1$ is a monovalent group having a structure derived from a first epoxy compound, $R^2$ is a monovalent group having a structure derived from a specific naphthalene compound and a second epoxy compound, and $R^3$ is a monovalent group having a structure derived from a third epoxy compound. In this case, at least one selected from the group consisting of the first epoxy compound, the second epoxy compound and the third epoxy compound may have a mesogenic structure, that is, one of the first epoxy compound to the third epoxy compound may be an epoxy compound having a mesogenic structure, two of them may each be an epoxy compound having a mesogenic structure, or three of them may each be an epoxy compound having a mesogenic structure. The first epoxy compound to the third epoxy compound each represent any epoxy compound, and may be the same as or different from each other. The first epoxy compound to the third epoxy compound may each be an epoxy compound that is a raw material or an intermediate of the above-described "reaction product between an epoxy compound and a specific naphthalene compound". The first epoxy compound to the third epoxy compound may each be a monomer or a polymer.

Here, the expression "$R^1$ represents a monovalent group having a structure derived from a first epoxy compound" means that the first epoxy compound is $R^1$—OGly (Gly represents a glycidyl group).

The expression "$R^3$ represents a monovalent group having a structure derived from a third epoxy compound" means that the third epoxy compound is $R^3$-Ep (Ep represents an epoxy group).

The expression "$R^2$ represents a monovalent group having a structure derived from a specific naphthalene compound and a second epoxy compound" means that the structure obtained by a reaction between the second epoxy compound and a specific naphthalene compound having —ZH as the functional group that is reactive with an epoxy group is $R^2$—ZH.

In the embodiment in which $R^1$ has a structure derived from a first epoxy compound, $R^2$ has a structure derived from a specific naphthalene compound and a second epoxy compound, and $R^3$ has a structure derived from a third epoxy compound, the compound of General Formula (a) may be a compound obtained by a reaction of a third epoxy compound represented by $R^3$-Ep with a secondary hydroxy group of a reaction product generated through a reaction between a first epoxy compound represented by $R^1$—OGly, any given second epoxy compound and a specific naphthalene compound.

In an embodiment, the epoxy compound represented by General Formula (a) may be an epoxy compound in which at least the monovalent groups represented by $R^1$ and $R^2$ each have an epoxy group, or may be an epoxy compound in which all of the monovalent groups represented by $R^2$ and $R^3$ have an epoxy group.

In General Formula (b), in the case in which the monovalent group represented by $R^1$ or $R^2$ has a mesogenic structure, the monovalent group may or may not have an epoxy group.

In the case in which the monovalent group represented by $R^1$ or $R^2$ has a mesogenic structure, the monovalent group may consist only of the mesogenic structure, or may have the mesogenic structure and another structure in combination.

In the case in which the monovalent group represented by $R^1$ or $R^2$ has an epoxy group, the position of the epoxy group in the monovalent group is not particularly limited. For example, the monovalent group may have an epoxy group at the terminal. Further, the number of epoxy groups included in the monovalent group is not particularly limited, and the monovalent group may have one epoxy group or may have two or more epoxy groups.

The epoxy compound represented by General Formula (b) may have one mesogenic structure or two or more mesogenic structures in a molecule thereof. In the case in which the epoxy compound represented by General Formula (b) has two or more mesogenic structures in a molecule thereof, these mesogenic structures may be the same or different.

In the case in which the monovalent group represented by $R^1$ or $R^2$ in General Formula (b) does not have a mesogenic structure, examples of the monovalent group include a monovalent group having, for example, an aliphatic hydrocarbon group, an aliphatic hydrocarbon-oxy group, an aromatic hydrocarbon group, or an aromatic hydrocarbon-oxy group. Preferable examples of the monovalent group include a monovalent group having an epoxy group and, for example, an aliphatic hydrocarbon group, an aliphatic hydrocarbon-oxy group, an aromatic hydrocarbon group, or an aromatic hydrocarbon-oxy group. Examples of the aliphatic hydrocarbon group include an alkyl group and an alkenyl group, and examples of the aromatic hydrocarbon group include a phenyl group and a naphthyl group.

In the case in which the monovalent group represented by $R^1$ or $R^2$ does not have a mesogenic structure, the number of carbon atoms in the monovalent group is not particularly limited, and may be, for example, 20 or less, or 15 or less. The monovalent group represented by $R^1$ and $R^2$ may each be unsubstituted or may each have a substituent.

In an embodiment, the epoxy compound represented by General Formula (b) may be an epoxy compound in which at least the monovalent group represented by $R^1$ has a mesogenic structure, or may be an epoxy compound in which the monovalent groups represented by $R^1$ and $R^2$ each have a mesogenic structure.

For example, $R^1$ may be a monovalent group having a structure derived from a first epoxy compound, and $R^2$ may be a monovalent group having a structure derived from a second epoxy compound and a specific naphthalene compound. In this case, one of the first epoxy compound and the second epoxy compound may be an epoxy compound having a mesogenic structure, or each of the first epoxy compound and the second epoxy compound may be an epoxy compound having a mesogenic structure. The first epoxy compound and the second epoxy compound each represent any epoxy compound, and may be the same as or different from each other. The first epoxy compound and the second epoxy compound may each be an epoxy compound that is a raw material or an intermediate of the above-described "reaction product between an epoxy compound and a specific naphthalene compound". The first epoxy compound and the second epoxy compound may each be a monomer or a polymer.

Note that the first epoxy compound and the second epoxy compound in General Formula (b) are independent from the first epoxy compound and the second epoxy compound in the embodiments related to General Formula (a).

The expression "$R^1$ represents a monovalent group having a structure derived from a first epoxy compound" means that the first epoxy compound is $R^1$—OGly (Gly represents a glycidyl group).

The expression "$R^2$ represents a monovalent group having a structure derived from a second epoxy compound and a specific naphthalene compound" means that the structure obtained by the reaction between the second epoxy compound and a specific naphthalene compound having —ZH as the functional group that is reactive with an epoxy group is $R^2$—ZH.

In the above-described embodiment in which $R^1$ is a monovalent group having a structure derived from a first epoxy compound and $R^2$ is a monovalent group having a structure derived from a second epoxy compound and a specific naphthalene compound, the compound of General Formula (b) may be a compound obtained by a reaction of a first epoxy compound represented by $R^1$—OGly, any given second epoxy compound, and a specific naphthalene compound.

In an embodiment, the epoxy compound represented by General Formula (b) may be an epoxy compound in which at least the monovalent group represented by $R^1$ has an epoxy group, or may be an epoxy compound in which each of the monovalent groups represented by $R^1$ and $R^2$ has an epoxy group.

[Synthesis Method of Specific Epoxy Compound]

The method for obtaining the specific epoxy compound by reacting an epoxy compound with a specific naphthalene compound is not particularly limited. Specifically, the reaction may be performed by dissolving an epoxy compound, the specific naphthalene compound and an optional reaction catalyst in a solvent, and stirring the mixture while heating to allow the reaction to proceed.

Alternatively, for example, the reaction may be performed by mixing an epoxy compound and a specific naphthalene compound without using a solvent or reaction catalyst, and stirring the mixture while heating to allow the reaction to proceed.

In the case of introducing into a reaction product a branching structure of the epoxy compound represented by General Formula (a), the method for introducing the branching structure is not particularly limited. For example, the branching structure can be introduced by reacting an epoxy group of an epoxy compound with a secondary hydroxy group generated by a reaction between an epoxy compound and a specific naphthalene compound.

The progress of the reaction between the secondary hydroxy group generated by the reaction of an epoxy compound and a specific naphthalene compound with the epoxy group of an epoxy compound can be controlled by, for example, appropriately selecting the type of reaction catalyst used for the reaction. For example, by employing a reaction catalyst having a relatively low activity, the proportion of the formed branching structures tends to become low since, while the reaction between the epoxy group of the epoxy compound and the functional group that is reactive with an epoxy group in the specific naphthalene compound proceeds, the reaction between the secondary hydroxy group generated by the foregoing reaction and another epoxy compound hardly proceeds. On the other hand, by employing a reaction catalyst having a relatively high activity, the proportion of the formed branching structures tends to become high since, in addition to the reaction between the epoxy group of the epoxy compound and the functional group that is reactive with an epoxy group in the specific naphthalene compound, the reaction between the secondary hydroxy group generated by the foregoing reaction and another epoxy compound proceeds.

The solvent is not particularly limited as long as it can dissolve the epoxy compound and the specific naphthalene compound, and can be heated to a temperature required to allow the reaction of these compounds to proceed. Specific examples of the solvent include cyclohexanone, cyclopentanone, ethyl lactate, propyleneglycol monomethyl ether, N-methylpyrrolidone, methyl cellosolve, ethyl cellosolve, and propyleneglycol monopropyl ether.

The amount of the solvent is not particularly limited as long as the epoxy compound, the specific naphthalene compound and the optional reaction catalyst can be dissolved at the reaction temperature. Although the solubility depends on the type of raw materials to be subjected to the reaction, the type of solvent and the like, the viscosity of the solution after the reaction tends to be in a preferred range when, for example, the solvent is used in an amount such that the initial solid content concentration becomes from 20% by mass to 60% by mass.

The type of reaction catalyst is not particularly limited, and an appropriate catalyst may be selected based on the reaction rate, reaction temperature, storage stability and the like. Specific examples include an imidazole compound, an organic phosphorous compound, a tertiary amine and a quaternary ammonium salt. One kind of reaction catalyst may be used singly, or two or more kinds thereof may be used in combination.

From the viewpoint of promoting the reaction between the epoxy compound and the specific naphthalene compound, the reaction catalyst is preferably an organic phosphorous compound or an imidazole compound. From the viewpoint of suppressing the self-polymerization of the epoxy groups, thereby suppressing the risk of gelation, and selectively promoting the reaction between the epoxy monomer and the compound having a functional group that is reactive with an epoxy group to control the structure of the specific epoxy compound to be obtained, and from the viewpoint of thermal resistance of the cured product, the reaction catalyst is preferably an organic phosphorous compound.

Preferable examples of the organic phosphorous compound include an organic phosphine compound; a compound having intramolecular polarization obtained by adding, to an organic phosphine compound, a compound having a π bond such as a maleic acid anhydride, a quinone compound, diazodiphenylmethane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine, and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenyl borate, tetra-p-tolyl borate and tetra-n-butyl borate.

In the case of introducing a branching structure of the epoxy compound represented by General Formula (a), the curing catalyst is preferably an inner salt-type phosphine compound or an intermolecular salt-type phosphine compound, and more preferably a reaction adduct of tributylphosphine and hydroquinone or a salt of tetrabutylphosphine and a carboxylic acid.

The amount of the reaction catalyst is not particularly limited. From the viewpoints of the reaction rate and storage stability, the amount of the reaction catalyst is preferably from 0.1 parts by mass to 1.5 parts by mass, and more preferably from 0.2 parts by mass to 1 part by mass, with respect to 100 parts by mass of the total amount of the epoxy compound and the specific naphthalene compound.

In the case in which the epoxy compound is reacted with the specific naphthalene compound, the epoxy compound may be thoroughly reacted, or part of the epoxy compound may remain unreacted.

The reaction between the epoxy compound and the specific naphthalene compound may be performed using a reaction container, such as a flask for small-scale synthesis, or a reaction cauldron for large-scale synthesis. A specific example of the synthesis method is described below.

First, an epoxy compound is placed in a reaction container, with a solvent being added as necessary, and is dissolved by heating the reaction container to a reaction temperature with an oil bath or a heating medium. A specific naphthalene compound is added thereto, with a reaction catalyst being subsequently added as necessary, to initiate the reaction. Subsequently, the solvent is distilled off as necessary under reduced pressure, whereby a specific epoxy compound is obtained.

The reaction temperature is not particularly limited as long as the reaction between the epoxy group of the epoxy compound and the functional group of the specific naphthalene compound proceeds. For example, the reaction temperature is preferably in a range of from 100° C. to 180° C., and more preferably in a range of from 100° C. to 150° C.

In the case in which the reaction temperature is 100° C. or higher, the time for completing the reaction tends to be shortened. In the case in which the reaction temperature is 180° C. or lower, likelihood of gelation tends to be reduced.

In the case of synthesizing the specific epoxy compound, the ratio between the epoxy compound and the specific naphthalene compound is not particularly limited. For example, the ratio may be adjusted such that the ratio between the number of equivalents of the epoxy group (A) and the number of equivalents of the functional group that is reactive with an epoxy group (B) (i.e., A:B), becomes in a range of 10:10 to 10:0.01. From the viewpoints of fracture toughness and thermal resistance of the cured product, the range of A:B is preferably in a range of 10:5 to 10:0.1.

From the viewpoint of ease of handling of the specific epoxy compound, the ratio of the number of equivalents of the epoxy group (A) to the number of equivalents of the functional group that is capable of reacting with the epoxy group (B) (i.e., A:B) is preferably in a range of 10:1.6 to 10:3.0, more preferably in a range of 10:1.8 to 10:2.9, and further preferably in a range of 10:2.0 to 10:2.8.

From the viewpoints of effectively achieving both favorable flexural modulus and fracture toughness, the ratio between the number of equivalents of the epoxy group (A) and the number of equivalents of the functional group that is capable of reacting with an epoxy group (B) (i.e., A:B) is preferably in a range of 10:1.0 to 10:3.0, more preferably in a range of 10:1.4 to 10:2.6, and further preferably in a range of 10:1.6 to 10:2.4.

The structure of the specific epoxy compound can be determined by, for example, matching the molecular weight of the specific epoxy compound that is predicted to be obtained from the reaction between the epoxy compound and the specific naphthalene compound with the molecular weight of the targeted compound determined by liquid chromatography using a liquid chromatograph equipped with a UV spectrum detector and mass spectrum detector.

The liquid chromatography can be performed in a manner described below. The UV spectrum detector detects the absorbance at a wavelength of 280 nm, and the detection by the mass spectrum detector is performed with an ionization voltage of 2700 V.

<Physical Properties of Epoxy Resin>

Hereinafter, physical properties of the epoxy resin according to the present disclosure, which contains the reaction product between an epoxy compound and a specific naphthalene compound, will be described in detail.

[Weight Average Molecular Weight]

The weight average molecular weight (Mw) of the epoxy resin is not particularly limited. From the viewpoint of lowering the viscosity, the weight average molecular weight (Mw) of the epoxy resin is preferably from 500 to 3000, more preferably 700 to 2500, and further preferably 800 to 2000.

In the present disclosure, the weight average molecular weight (Mw) is a value measured by liquid chromatography. The liquid chromatography can be performed, for example, under the following conditions. For example, the liquid chromatography is performed by a gradient method using LaChrom II C18 from Hitachi, Ltd. as an analysis column, continuously changing the mixture ratio (by volume) of the eluent in the order of acetonitrile/tetrahydrofuran/10 mmol/l aqueous ammonium acetate solution=20/5/75, acetonitrile/tetrahydrofuran=80/20 (20 min from the start), and acetonitrile/tetrahydrofuran=50/50 (35 min from the start). The liquid chromatography is performed at a flow rate of, for example, 1.0 ml/min.

[Epoxy Equivalent Weight]

The epoxy equivalent weight of the epoxy resin is not particularly limited. From the viewpoints of, for example, flowability of the epoxy resin, thermal conductivity of the cured product, or achieving both favorable fracture toughness and flexural modulus, the epoxy equivalent weight is preferably from 245 g/eq to 500 g/eq, more preferably from 250 g/eq to 450 g/eq, and further preferably from 260 g/eq to 400 g/eq. In the present disclosure, the epoxy equivalent weight is measured by perchloric acid titration.

[Viscosity]

The viscosity of the epoxy resin is not particularly limited, and can be determined in accordance with the use of the epoxy resin. From the viewpoint of ease of handling, the viscosity of the epoxy resin at 100° C. is preferably 200 Pa·s or less, more preferably 100 Pa s or less, and further preferably 20 Pa·s or less.

The viscosity of the epoxy resin at 100° C. can be measured using a cone and plate viscometer (e.g., CAP2000 from Brookfield). For example, the measurement may be performed under the condition of a measurement temperature of 100±2° C. with a rotation speed of 50 rotations per speed (rpm) using cone No. 5.

[Viscosity Stability]

In the case in which the epoxy resin contains the above-described epoxy compound represented by General Formula (a), increase in viscosity upon application of shear stress tends to be suppressed, whereby favorable viscosity stability tends to be exhibited. The viscosity stability of the epoxy resin can be determined by, for example, continuously measuring the melt viscosity while applying shear stress to the epoxy resin under a predetermined condition using a viscoelastometer.

For example, it can be determined that the epoxy resin has a favorable viscosity stability with the degree of increase in the viscosity upon application of shear stress being small when the value of $\eta'2/\eta'1$ is small, the value of $\eta'2/\eta'1$ being obtained by $\eta'1$ (Pa·s) representing an initial (immediately after the start of the measurement) dynamic shear viscosity and $\eta'2$ (Pa·s) representing the maximum value of the dynamic shear viscosity obtained during the measurement, the dynamic shear viscosity measurement being performed with a gap between the parallel plate and the stage of 0.05 mm, a frequency of 0.5 Hz, a strain of 8000% and a temperature of 80° C. (constant) over 80 continuous minutes.

The value of $\eta'2/\eta'1$ is not particularly limited, and may be, for example, 3 or less, 2 or less, or 1.5 or less, from the viewpoint of ease of handling.

The absolute value of the dynamic shear viscosity measured by the above-described method is not particularly limited. For example, the initial dynamic shear viscosity $\eta'1$ may be 200 Pas or less.

[GPC Peak Area Ratio]

The content of the monomer of an epoxy compound with respect to the total amount of the entire epoxy resin in the epoxy resin according to the present disclosure is not particularly limited. The content can be obtained by the percentage (%) of the area of the peak originated from the monomer of the epoxy compound with respect to the total area of the peaks originated from the entire epoxy resin (hereinafter, this percentage is also referred to as "GPC peak area ratio M") in the chart obtained by gel permeation chromatography (GPC). Specifically, the absorbance of the epoxy resin of interest is detected at a wavelength of 280 nm, and the content is calculated using the following equation based on the total area of all the detected peaks and the area of the peak corresponding to the monomer of the epoxy compound.

GPC peak area ratio $M$ (%)=(area of the peak corresponding to the monomer of the epoxy compound/total area of the peaks originated from the entire epoxy resin)×100

From the viewpoint of handleability, the GPC peak area ratio M is preferably 50% or less, more preferably 49% or less, and further preferably 48% or less. The GPC peak area ratio M of 50% or less tends to result in favorable handleability since the viscosity tends to drop easily upon temperature increase.

The content of the above-described epoxy compound represented by General Formula (a) with respect to the total amount of the entire epoxy resin in the epoxy resin is not particularly limited. The content can be obtained by the percentage (%) of the area of the peak originated from the epoxy resin represented by General Formula (a) with respect to the total area of the peaks originated from the entire epoxy resin (hereinafter, this percentage is also referred to as "GPC peak area ratio B") in the chart obtained by GPC. Specifically, the absorbance of the epoxy resin of interest is detected at a wavelength of 280 nm, and the content is calculated using the following equation based on the total area of all the detected peaks and the area of the peak corresponding to the epoxy compound represented by General Formula (a).

GPC peak area ratio $B$ (%)=(area of the peak corresponding to the epoxy compound represented by General Formula ($a$)/total area of the peaks originated from the entire epoxy resin)×100

From the viewpoint of improving the viscosity stability, the GPC peak area ratio B may be 3% or more, 5% or more, or 7% or more. The GPC peak area ratio B may be 15% or less, 12% or less, or 10% or less.

The gel permeation chromatography is performed by using tetrahydrofuran as a mobile phase, at a sample concentration of 0.5% by mass and a flow rate of 1.0 ml/min. The measurement can be performed by using, for example, a high-speed liquid chromatograph L6000 from Hitachi, Ltd and a data analyzer C-R4A from Shimadzu Corporation. For the column, for example, a GPC column such as G2000HXL or G3000 HXL from Tosoh Corporation can be used.

<<Epoxy Resin Composition and Epoxy Resin Cured Product>>

The epoxy resin composition in the present disclosure includes the above-described epoxy resin and a curing agent. From the viewpoint of fracture toughness, the epoxy resin composition is preferably capable of forming a smectic structure or nematic structure in the cured product.

The epoxy resin cured product is a cured product obtained by curing the epoxy resin composition according to the present disclosure.

<Curing Agent>

The curing agent is not particularly limited as long as it is capable of causing a curing reaction with an epoxy resin. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. One kind of curing agent may be used singly, or two or more kinds thereof may be used in combination.

From the viewpoint of forming a higher-order structure in the cured product of the epoxy resin composition, the curing agent is preferably an amine curing agent or a phenol curing agent, and more preferably an amine curing agent. The amine curing agent is preferably an amine curing agent having an aromatic ring and an amino group, more preferably an amine curing agent having an aromatic ring with an amino group directly bonded thereto, and further preferably an amine curing agent having an aromatic ring with two or more amino groups directly bonded thereto. Examples of the aromatic ring include a benzene ring and a naphthalene ring.

Specific examples of the amine curing agent include 3,3'-diaminodiphenyl sulfone, 4,4'-diaminodiphenyl sulfone, 4,4'-diaminodiphenylmethane, 4,4'-diaminodiphenyl ether, 4,4'-diamino-3,3'-dimethoxybiphenyl, 4,4'-diaminophenyl benzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide and trimethylene-bis-4-aminobenzoate.

From the viewpoint of forming a smectic structure in a cured product of the epoxy resin composition, the curing agent is preferably 3,3'-diaminodiphenyl sulfone, 4,4'-diaminodiphenyl sulfone, 1,3-diaminobenzene, 1,4-diaminobenzene, 4,4'-diaminobenzanilide, 1,5-diaminonaphthalene, 4,4'-diaminodiphenylmethane or trimethylene-bis-4-aminobenzoate. From the viewpoint of obtaining a cured product with a low moisture absorption and high fracture toughness, 3,3'-diaminodiphenyl sulfone is more preferable.

Examples of the phenol curing agent include a low-molecular phenol compound, and a phenol novolac resin obtained by linking a low-molecular phenol compound with a methylene chain or the like. Examples of the low-molecular phenol compound include a monofunctional phenol compound such as phenol, o-cresol, m-cresol or p-cresol; a bifunctional phenol compound such as catechol, resorcinol or hydroquinone; and a trifunctional phenol compound such as 1,2,3-trihydroxybenzene, 1,2,4-trihydroxybenzene or 1,3,5-trihydroxybenzene.

The content of the curing agent in the epoxy resin composition is not particularly limited. From the viewpoint of efficiency of the curing reaction, the content of the curing agent preferably satisfies a ratio of the number of equivalents of the functional group of the curing agent contained in the epoxy resin composition (in the case of an amine curing agent, the number of equivalents of the active hydrogen) to the number of equivalents of the epoxy group of the epoxy resin contained in the epoxy resin composition (number of equivalents of the functional group/number of equivalents of the epoxy group) of from 0.3 to 3.0, more preferably from 0.5 to 2.0.

<Other Components>

The epoxy resin composition may contain components different from the epoxy resin and the curing agent as necessary. For example, the epoxy resin composition may contain a curing catalyst, a filler or the like. Specific examples of the curing catalyst include the compounds described above as a reaction catalyst used for the synthesis of the specific epoxy compound.

<Physical Properties of Epoxy Resin Cured Product>

[Fracture Toughness]

The cured product of the epoxy resin composition preferably has a fracture toughness of 0.6 MPa·m$^{1/2}$ or more, more preferably 1.0 MPa·m$^{1/2}$ or more, further preferably 1.2 MPa·m$^{1/2}$ or more, particularly preferably 1.5 MPa·m$^{1/2}$ or more, and extremely preferably 2.0 MPa·m$^{1/2}$ or more.

The fracture toughness value of a cured product can be measured by performing a three-point flexural test in accordance with ASTM D5045. Specifically, the fracture toughness can be measured by the method described below in the Examples section.

[Flexural Modulus]

The cured product of the epoxy resin composition preferably has a flexural modulus of 2.7 GPa or more, more preferably 2.8 GPa or more, further preferably 2.9 GPa or more, and particularly preferably 3.0 GPa or more.

The flexural modulus of a cured product can be measured by a three-point flexural test in accordance with JIS K7171 (2016). Specifically, the flexural modulus can be measured by the method described below in the Examples section.

In particular, it is preferable that the fracture toughness is 1.2 MPa·m$^{1/2}$ or more and the flexural modulus is 2.8 GPa or more.

[Glass Transition Temperature]

The glass transition temperature of the cured product of the epoxy resin composition is preferably 145° C. or higher, more preferably 150° C. or higher, and further preferably 155° C. or higher.

The glass transition temperature of a cured product can be measured, for example, as follows. Specifically, the cured product is cut into a strip shape to prepare a test piece, and subjected to a dynamic viscoelasticity measurement in a tensile mode under the measurement condition of a frequency of 10 Hz, a temperature elevation rate of 5° C./min, and a strain of 0.1%. The temperature corresponding to the maximum value of tan δ in a temperature-tan δ chart can be determined as the glass transition temperature. For the evaluation equipment, for example, RSA-G2 (TA Instruments) can be used.

<Use of Epoxy Resin Composition and Epoxy Resin Cured Product>

The use of the epoxy resin composition and the epoxy resin cured product is not particularly limited, and they can be suitably used for applications that require excellent fracture toughness and flexural modulus. For example, the epoxy resin composition and the epoxy resin cured product may be suitably used for producing an FRP used for airplanes, spaceships or the like.

Further, the epoxy resin composition in the present disclosure can be suitably used in a processing step that requires low viscosity and excellent flowability. For example, the epoxy resin composition can be suitably used in a processing method from which addition of solvent is preferably omitted or the amount of solvent is preferably reduced from the viewpoint of suppressing the occurrence of voids in the cured product (e.g., production of FRPs used for airplanes, spaceships or the like). Further, the epoxy resin composition can be suitably used, for example, in the production of an FRP that involves impregnating fibers with an epoxy resin composition that is being heated, or in the production of a sheet-shaped product that involves spreading an epoxy resin composition that is being heated with a squeegee or the like.

<<Composite Material>>

A composite material in the present disclosure includes the epoxy resin cured product according to the present disclosure and a reinforcing material.

The material of the reinforcing material included in the composite material is not particularly limited, and may be selected in accordance with, for example, the use of the composite material. Specific examples of the reinforcing material include a carbon material, glass, an aromatic polyamide resin such as Kevlar (registered trade name), ultra-high-molecular-weight polyethylene, alumina, boron nitride, aluminum nitride, mica and silica. The shape of the reinforcing material is not particularly limited, and examples thereof include fibers and particles (filler). From the viewpoint of the strength of the composite material, the reinforcing material is preferably a carbon material, and more preferably carbon fibers. The composite material may include one kind of reinforcing material singly, or may include two or more kinds thereof in combination.

The form of the composite material is not particularly limited. Examples thereof include a composite material having a structure in which at least one cured product-containing layer that contains the epoxy resin cured product and at least one reinforcing material-containing layer that contains a reinforcing material are layered on one another.

Examples

Embodiments in the present disclosure will be described in detail below by way of Examples. However, the embodiments are not limited to these Examples. The units "part" and "%" are based on mass, unless otherwise specified.

[Synthesis of Epoxy Resin]

The following materials were used for the synthesis of the epoxy resins.

—Epoxy Compounds—

Epoxy Compound 1: a biphenyl epoxy compound; YL6121H (Mitsubishi Chemical Corporation, epoxy equivalent weight: 170 g/eq to 180 g/eq)

Epoxy Compound 2: trans-4-{4-(2,3-epoxypropoxy)phenyl}cyclohexyl=4-(2,3-epoxypropoxy)benzoate (epoxy equivalent weight: 227 g/eq)

—Modifying Agents—

44BP: 4,4'-biphenol (Honshu Chemical Industry Co. Ltd., hydroxy group equivalent weight: 93 g/eq)

14DON: 1,4-dihydroxynaphthalene (Fujifilm Wako Pure Chemical Corporation, hydroxy group equivalent weight: 80 g/eq)

15DON: 1,5-dihydroxynaphthalene (Fujifilm Wako Pure Chemical Corporation, hydroxy group equivalent weight: 80 g/eq)

16DON: 1,6-dihydroxynaphthalene (Fujifilm Wako Pure Chemical Corporation, hydroxy group equivalent weight: 80 g/eq)

23DON: 2,3-dihydroxynaphthalene (Fujifilm Wako Pure Chemical Corporation, hydroxy group equivalent weight: 80 g/eq)

26DON: 2,6-dihydroxynaphthalene (Fujifilm Wako Pure Chemical Corporation, hydroxy group equivalent weight: 80 g/eq)

27DON: 2,7-dihydroxynaphthalene (Fujifilm Wako Pure Chemical Corporation, hydroxy group equivalent weight: 80 g/eq)

—Reaction Catalyst—

TBP-2: a reaction adduct of tributylphosphine and hydroquinone 125 parts by mass of an epoxy compound were mixed with 185 parts by mass of cyclohexanone, and was dehydrated under a reflux condition. A modifying agent was then added in an amount corresponding to 20 equivalents with respect to 100 equivalents of the epoxy compound and was dissolved, followed by adding a reaction catalyst in an amount of 1% by mass with respect to the mass of the epoxy compound, and the mixture was heated for 3 hours under reflux conditions. Thereafter, the solvent was removed under vacuum conditions and a temperature condition of a maximum temperature of 170° C., whereby an epoxy resin was obtained. The solid content of the epoxy resins synthesized in each of the Examples and Comparative Examples were 99.0% by mass or more.

The epoxy compounds synthesized in Examples 1 to 7 and Comparative Examples 2 and 3 each contain an epoxy compound having a branching structure (i.e., corresponding to General Formula (a)).

[Measurement of Viscosity]

The viscosity of the epoxy compounds was measured using a cone and plate viscometer (CAP2000 from Brookfield). The measurement was performed at a temperature of 100±2° C. with a rotation speed of 50 rotations per speed (rpm) using cone No. 5.

[Measurement of Flexural Modulus]

Each of the epoxy compounds obtained in the Examples and Compound Examples was mixed with a curing agent, which was 3,3'-diaminodiphenyl sulfone, at an equivalent ratio of 1:1. The mixture was placed in a stainless dish and heated to 180° C. on a hot plate, and subsequently subjected to a defoaming process at 150° C. under vacuum condition. Thereafter, the resultant was heated at 180° C. for 4 hours in an oven, whereby a cured product of the epoxy resin composition was obtained. The thus-obtained cured product was cut out to prepare a test piece for the assessment of flexural modulus.

The flexural modulus was calculated by performing a three-point flexural test using the prepared test pieces in accordance with JIS K7171 (2016). For the evaluation equipment, Instron 5948 (Instron) was used. The span was 32 mm, and the test speed was 1 mm/min.

[Measurement of Fracture Toughness]

Epoxy resin compositions and cured products thereof were obtained under the same condition as the foregoing using the epoxy resins synthesized in the Examples and Comparative Examples. The obtained cured products were cut into pieces of 3.75 mm×7.5 mm×33 mm to prepare test pieces for the fracture toughness evaluation.

The fracture toughness values (MPa·m$^{1/2}$) were calculated by performing a three-point flexural test in accordance with ASTM D5045. For the evaluation equipment, Instron 5948 (Instron) was used.

| | Items | | Comparative Example 1 | Comparative Example 2 | Example 1 | Comparative Example 3 | Example 2 |
|---|---|---|---|---|---|---|---|
| Epoxy Resin Synthesis Composition | Epoxy Compound | Epoxy Compound 1 | | X | X | | |
| | | Epoxy Compound 2 | X | | | X | X |
| | Modifying Agent | 44BP | | X | | X | |
| | | 14DON | | | | | |
| | | 15DON | | | X | | X |
| | | 16DON | | | | | |
| | | 23D0N | | | | | |
| | | 26DON | | | | | |
| | | 27DON | | | | | |
| | Reaction Catalyst | TBP-2 | X | X | X | X | X |
| | Epoxy Compound/ Modifying Agent Ratio of Equivalents (eq/eq) | | 100/0 | 100/20 | 100/20 | 100/20 | 100/20 |
| Properties of Epoxy Resin | Viscosity at 100° C. (Pa · s) | | undissolved | 3 | 4 | 4 | 5 |
| Properties of Cured Product | Flexural Modulus (GPa) | | 2.7 | 3 | 3.3 | 2.7 | 3.1 |
| | Fracture Toughness Gic (MPa · m$^{1/2}$) | | 2.3 | 1 | 1.2 | 2.3 | 2.1 |

| | Items | | Example 3 | Example 4 | Example 5 | Example 6 | Example 7 |
|---|---|---|---|---|---|---|---|
| Epoxy Resin Synthesis Composition | Epoxy Compound | Epoxy Compound 1 | | | | | |
| | | Epoxy Compound 2 | X | X | X | X | X |
| | Modifying Agent | 44BP | | | | | |
| | | 14DON | X | | | | |
| | | 15DON | | | | | |
| | | 16DON | | X | | | |
| | | 23D0N | | | X | | |
| | | 26DON | | | | X | |
| | | 27DON | | | | | X |
| | Reaction Catalyst | TBP-2 | X | X | X | X | X |
| | Epoxy Compound/ Modifying Agent Ratio of Equivalents (eq/eq) | | 100/20 | 100/20 | 100/20 | 100/20 | 100/20 |
| Properties of Epoxy Resin | Viscosity at 100° C. (Pa · s) | | 5 | 5 | 5 | 5 | 5 |
| Properties of Cured Product | Flexural Modulus (GPa) | | 2.8 | 2.9 | 2.8 | 3 | 2.8 |
| | Fracture Toughness Gic (MPa · m$^{1/2}$) | | 2 | 1.9 | 2 | 2 | 2.1 |

In the Examples in which Epoxy Compound 1 or Epoxy Compound 2 was modified with a naphthalene compound, the cured products had both favorable flexural modulus and favorable fracture toughness. In particular, in Example 1 and Example 2, in which 1,5-dihydroxynaphthalene was used, and in Example 6, in which 2,6-dihydroxynaphthalene was used, particularly favorable flexural modulus was obtained while fracture toughness was not largely lowered.

Accordingly, it is thought that the epoxy resins in the Examples are useful materials for applications in which achieving both high fracture toughness and high flexural modulus is desired, in particular, in applications such as a CFRP binder for airplanes or the like, so as to achieve further weight reduction of airplanes and low fuel consumption.

The disclosure of Japanese Patent Application 2018-168843 is incorporated herein by reference.

All the documents, patent applications and technical standards that are described in the present specification are hereby incorporated by reference to the same extent as if each individual document, patent application or technical standard is concretely and individually described to be incorporated by reference.

The invention claimed is:

1. An epoxy resin comprising a reaction product between an epoxy compound and a compound having a naphthalene structure and a functional group that is reactive with an epoxy group,
    wherein the epoxy compound includes a structure of the following Formula (M-2) or (M-3):

(M-2)

(M-3)

wherein, in Formulae (M-2) and (M-3), Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom; and
    wherein the compound having a naphthalene structure and a functional group that is reactive with an epoxy group includes a dihydroxynaphthalene compound.

2. The epoxy resin according to claim 1, wherein the dihydroxynaphthalene compound includes at least one selected from the group consisting of 1,5-dihydroxynaphthalene and 2,6-dihydroxynaphthalene.

3. The epoxy resin according to claim 1, wherein the reaction product includes a compound represented by the following General Formula (a):

(a)

wherein, in General Formula (a), each of $R^1$, $R^2$ and $R^3$ independently represents a monovalent group, wherein at least one of the monovalent groups represented by $R^1$, $R^2$ and $R^3$ has a mesogenic structure, and at least one of the monovalent groups represented by $R^1$, $R^2$ and $R^3$ has an epoxy group; and each Z independently represents —O— or —NH—.

4. The epoxy resin according to claim 3,
    wherein the epoxy compound comprises a first epoxy compound, a second epoxy compound and a third epoxy compound,
    wherein, in General Formula (a),
    $R^1$ is a monovalent group having a structure derived from the first epoxy compound,
    $R^2$ is a monovalent group having a structure derived from the second epoxy compound and the compound having a naphthalene structure and a functional group that is reactive with an epoxy group, and
    $R^3$ is a monovalent group having a structure derived from the third epoxy compound,
    wherein the first epoxy compound, the second epoxy compound and the third epoxy compound may be the same as or different from each other, and
    wherein at least one of the first epoxy compound, the second epoxy compound or the third epoxy compound has a mesogenic structure.

5. The epoxy resin according to claim 1, wherein, in an 80-minute continuous measurement of dynamic shear viscosity at a temperature of 80° C. using a viscoelastometer with a gap between a parallel plate and a stage of 0.05 mm, a frequency of 0.5 Hz and a strain of 8000%, a value of $\eta'2/\eta'1$ is 3 or less, the value of $\eta'2/\eta'1$ being obtained from an initial dynamic shear viscosity $\eta'1$ (Pa·s) and a maximum value of dynamic shear viscosity $\eta'2$ (Pa·s) obtained during the measurement.

6. The epoxy resin according to claim 5, wherein the initial dynamic shear viscosity $\eta'1$ is 200 Pa·s or less.

7. An epoxy resin composition comprising the epoxy resin according to claim 1 and a curing agent.

8. An epoxy resin cured product, which is a cured product of the epoxy resin composition according to claim 7.

9. A composite material comprising the epoxy resin cured product according to claim 8 and a reinforcing material.

* * * * *